United States Patent Office 3,212,746
Patented Oct. 19, 1965

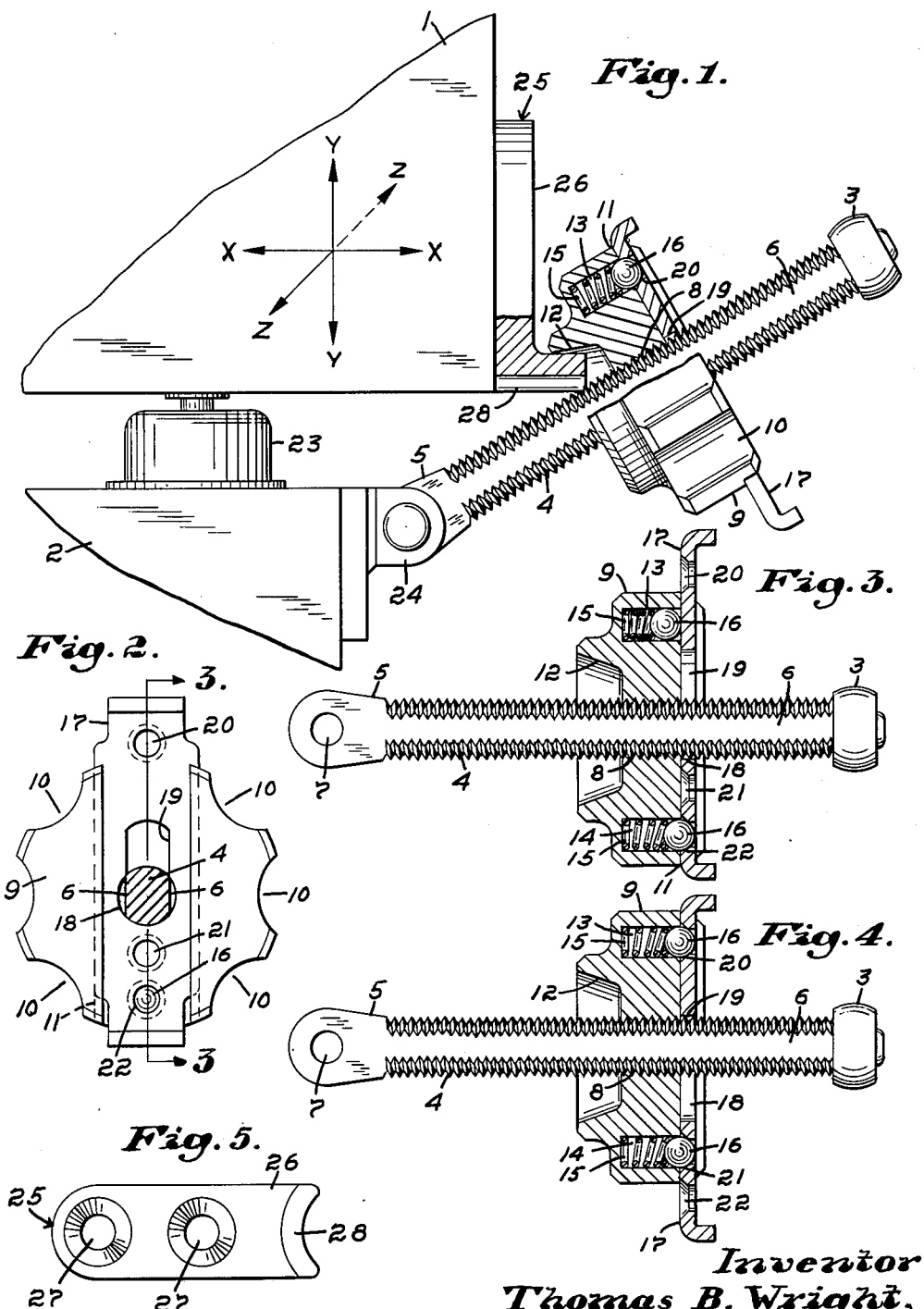

3,212,746
LOCKING CLAMPING ASSEMBLY
Thomas B. Wright, Oakland, Calif., assignor to United-Carr Incorporated, a corporation of Delaware
Filed Jan. 2, 1964, Ser. No. 335,316
5 Claims. (Cl. 248—361)

This invention relates generally to fastening devices and more particularly to devices of the class used to secure a shock mounted container to a support, the basic criteria for such a device being that it must be capable of maintaining the position of a container within certain predetermined limits while at the same time allowing sufficient movement to render the shock amount effective as a vibration isolator.

The invention is seen to have particular application as a device for securing containers which are designed to protect delicate, sophisticated electronic and electromechanical equipment. In particular where the container is located in a vehicle, aircraft, or other environment wherein it will be subjected to conditions of extreme vibration and potentially, severe shock.

Thus, an object of the invention is to provide a device which is capable of positively securing a container in a highly efficient manner while simultaneously allowing for a certain amount of movement to accommodate vibration isolating mechanisms.

A further object of the invention is to provide a free spinning locking clamp capable of traversing a locking bar, which clamp may be positively locked to the bar at any point along the traverse.

The invention will be more clearly understood from the following detailed description when read in conjunction with the accompanying drawings in which:

FIG. 1 is a side elevation partly in section of an installation employing the invention;

FIG. 2 is a top plan view partly in section of the locking clamp assembly;

FIG. 3 is a section taken on line 3—3 of FIG. 2 showing the bolt in its entirety and the locking slide in the unlocked position;

FIG. 4 is a view similar to that of FIG. 3 with the slide shown in the locking position; and FIG. 5 is a top plan view of the catch shown in FIG. 1.

As a convenient form of disclosure, the invention has been depicted in an application wherein it is utilized to secure a container 1 to a support 2 which might, for example, represent a shelf mounted in an aircraft.

As best shown in FIGS. 2 and 3, the bolt has a head 3 and a shank 4. The shank 4 is partially threaded throughout the major portion of its length and terminates in an unthreaded partially flat stud 5 at its end remote from the head 3. The threaded portion of the shank 4 has milled flats 6 on its opposite sides. The unthreaded stud portion 5 has an aperture 7 for receiving a hinge pin.

The clamp having a central threaded bore 8 is in threaded engagement with the shank 4 of the bolt. As FIG. 2 shows, the main body portion 9 of the clamp has a series of notches 10 formed circumferentially on its outside wall. One end of the body portion 9 has an undercut slot 11 located therein, while the opposite end is tapered and recessed to form a hook-like portion 12.

The main body portion of the clamp also has two comparatively deep recesses 13 and 14 formed within its periphery along a common diameter and opening into the undercut slot 11. Each of these recesses contains a spring 15 and a ball 16 resting on said spring adjacent the open end of said recess.

A locking slide 17 is seated in the undercut slot 11 in the body portion 9 of the clamp. The slide 17 has an aperture 18 corresponding in diameter to the central bore 8 in the body portion 9. One segment of the aperture 18 opens into a hollow keyway 19 which has a width corresponding to the distance across the milled flats 6 of the bolt. The slide 17 also has three smaller apertures 20, 21, and 22 countersunk therein, each of which has a maximum diameter somewhat larger than that of the balls 16, the depth of the countersink being approximately one half the thickness of the slide 17.

FIG. 3 shows the locking clamp assembly with the slide 17 retracted, i.e. in the unlocked position. With the slide so retracted, the aperture 18 is in congruous alignment with the central bore 8. Thus the clamp may be freely rotated and exerts negligible torque on the bolt. Further, the countersunk aperture 22 is aligned with the recess 14, thereby allowing the spring loaded ball 16 to seat in the aperture 22 so as to maintain the slide in the unlocked position.

FIG. 4 depicts the assembly with the slide 17 thrust into the locking position. The parallel walls of the keyway 19 have engaged the milled flats 6 of the bolt. Thus it is impossible for one to further rotate the clamp on the bolt.

One observes that the countersunk apertures 20 and 21 in the slide 17 are now in alignment with the recesses 13 and 14 respectively, thereby allowing the spring loaded balls 16 to seat, one in each aperture, to maintain the slide in the locked position.

It would be well to point out that, as shown in FIG. 4 the clamp is positively locked to the bolt and will remain so locked even under conditions of extreme vibration. In fact, it is virtually impossible for the clamp to become unlocked unless considerable force is applied directly to the slide 17 parallel its long axis in the direction necessary to disengage the keyway 19 from the milled flats 6.

FIG. 1 depicts an installation utilizing the locking clamp assembly to secure a container 1 to a support 2. The container 1 is mounted on a vibration isolator 23 which in turn is affixed to the top surface of the support 2. To render the isolating mechanism effective the container must be capable of movement in a vertical direction, i.e., parallel to the Y axis. The container may also move in a horizontal direction, i.e., parallel the X axis, to reduce the effect of forces acting on it from the right or left as shown.

The bolt is secured to the side of the support 2 by the hinge 24 and may be pivoted vertically with respect to the support.

A catch 25, shown in detail in FIG. 5, is mounted on the side of the container 1. The catch 25 is best described as an elongated mounting plate 26 with a plurality of holes 27 adapted to receive a machine screw or other fastening means formed therein and a projection 28, having the configuration of a cylindrical segment, extending perpendicularly from one end of the plate. The maximum (outside) radius of the projection 28 is approximately equal to the median, inside radius of the hook-like portion 12 of the clamp.

One secures the container by pivoting the bolt upwards towards the container while maintaining the slide 17 in the unlocked position, and thence rotating the clamp forward on the bolt until the hook-like portion 12 engages the projection 28 of the catch 25. The slide 17 is then thrust into the locking position and immediately, positively locks the clamp to the bolt and the catch.

Thereafter as vibratory forces cause the container to ride up and down on the isolator 23 the bolt will simultaneously pivot vertically, i.e. on the Z axis in the Y direction, and the interengaged surfaces of the hook 12 and the catch 25 will slide with respect to each other.

This sliding motion of the internal surfaces of the hook 12 on the external surface of the projection 28 as the container moves and the bolt pivots is highly significant in that it provides for smooth, fluid-like vertical and horizontal movement of the container as opposed to a jerky, interrupted motion which is obviously undesirable.

Of course, the parameters have been predetermined so that the maximum distance the container can move downwardly, which corresponds to the most depressed position of the isolator 23, is insufficient to allow the hook 12 to become completely disengaged from the catch 25.

The container is therefore securely fixed to the support 2 without destroying the effectiveness of the vibration isolator 23.

While FIG. 1 shows only a single locking clamp assembly secured to the right side of the container and the support, obviously an identical installation is required on the left side. Moreover, as many clamps as are deemed necessary may be utilized on the parallel sides of the support and container. Likewise several vibration isolators may be required.

From a viewing of the installation of FIG. 1 one may also readily surmise that the container is capable of some movement in its horizontal plane, i.e. along the X axis.

Should vibration tend to move the container to the right the clamping assemblies will automatically compensate since the right hand bolt will pivot downwardly and the left hand assembly upwardly. The converse would of course be true should the container be forced to the left.

Obviously, since the bolt cannot pivot horizontally in a plane parallel to the Z axis, it is impossible for the container to twist or move back and forth in that plane.

A further salient feature of the invention which warrants emphasis is that a single installation of the locking clamp assembly(s) can accommodate a wide range of containers of various widths and lengths since the clamp may be locked at any point along its traverse of the bolt and the bolt may be of any desired length which space limitations will permit.

It is also contemplated that the orientation of the respective parts of the assembly could be reversed. That is the catch 25 could be mounted on the support 2 and the hinge 24 mounted on the container. The bolt would then pivot with respect to the container rather than the support but the assembly would otherwise function in the manner previously described.

With reference to the foregoing description it is to be understood that what has been disclosed therein represents only a single embodiment of the invention. For example, in addition to the variations previously mentioned, it is contemplated that the locking clamp assembly might be utilized to secure slidable, electronic racks and chassis.

The disclosure is, therefore, to be construed as illustrative rather than restrictive or limiting in nature, the scope of the invention being best described by the following claims.

I claim:

1. A fastener combination comprising a catch, a bolt having a partially threaded, partially flat shank, a clamp capable of lateral and rotational movement with respect to said shank, portions of said clamp having been recessed to provide a hook-like portion capable of engaging said catch, a slide carried by said clamp capable of engaging the flats of said shank to lock said clamp to said shank and said catch and spring loaded means carried by said clamp to maintain said locked relationship.

2. A fastener combination according to claim 1 wherein said flat portions of said shank extend over the same length thereof as said threaded portions whereby said clamp may be locked to said shank at any point along the threaded portion thereof.

3. A fastener combination comprising a catch, a bolt, a clamp capable of lateral and rotational movement with respect to said bolt, said clamp having been recessed to provide a hook-like portion capable of engaging said catch, and a slide carried by said clamp, said slide being movable in opposite directions responsive to an externally applied force, transversely of said clamp to lock said clamp to said bolt and to unlock said clamp from said bolt.

4. A fastener combination according to claim 3 wherein said clamp is equipped with means for retaining said slide in the unlocked position with respect to said bolt.

5. A fastener combination comprising a catch, a bolt having a partially threaded, partially flat shank, a clamp capable of lateral and rotational movement with respect to said shank, said clamp having a first recess providing a hook-like portion capable of engaging said catch, and a locking slide carried by said clamp capable of engaging the flats of said shank to lock said clamp to said shank, said slide being located in a second recess in said clamp opposite said first recess and being movable, responsive to an externally applied force, transversely of said clamp in one direction to engage said shank and transversely of said clamp in the opposite direction to disengage from said shank.

References Cited by the Examiner

UNITED STATES PATENTS

| | | | |
|---|---|---|---|
| 533,099 | 1/95 | Swan | 151—2 |
| 1,155,627 | 10/15 | Travers | 248—406 |
| 2,585,985 | 2/52 | Anderson | 33—50 |
| 2,798,635 | 7/57 | Elkind | 220—55 X |

CLAUDE A. LE ROY, *Primary Examiner.*